United States Patent
Schubert et al.

(10) Patent No.: US 6,305,834 B1
(45) Date of Patent: Oct. 23, 2001

(54) METHOD AND DEVICE FOR PRODUCING A DISPERSED MIXTURE VIA CROSSING PARTIAL FLOWS

(75) Inventors: Klaus Schubert, Karlsruhe; Wilhelm Bier, Eggenstein-Leopoldshafen; Gerd Linder, Karlsruhe; Erhard Herrmann, Leverkusen; Bernd Klinksiek, Bergisch Gladbach; Bernd Krumbach, Leverkusen, all of (DE)

(73) Assignees: Forschungszentrum Karlsruhe GmbH, Karlsruhe; Bayer AG, Leverkusen, both of (DE)

( * ) Notice: Subject to any disclaimer, the term of this patent is extended or adjusted under 35 U.S.C. 154(b) by 0 days.

(21) Appl. No.: 09/355,638
(22) PCT Filed: Jan. 16, 1998
(86) PCT No.: PCT/EP98/00217
§ 371 Date: Oct. 4, 1999
§ 102(e) Date: Oct. 4, 1999
(87) PCT Pub. No.: WO98/33582
PCT Pub. Date: Aug. 6, 1998

(30) Foreign Application Priority Data

Feb. 1, 1997 (DE) .............................................. 197 03 779

(51) Int. Cl.[7] .............................. B01F 5/06; B01F 15/06
(52) U.S. Cl. ......................... 366/144; 366/337; 366/340; 165/109.1; 165/166
(58) Field of Search .................................... 366/144, 147, 366/181.5, 336, 337, 340; 48/189.4; 165/109.1, 166; 138/37–39, 42

(56) References Cited

U.S. PATENT DOCUMENTS

| | | | |
|---|---|---|---|
| 4,222,671 | * 9/1980 | Gilmore | 366/337 |
| 5,094,788 | * 3/1992 | Schrenk et al. | 366/340 |
| 5,137,369 | * 8/1992 | Hodan | 366/337 |
| 5,531,831 | * 7/1996 | Sweeney et al. | 366/340 |
| 5,803,600 | * 9/1998 | Schubert et al. | 366/337 |
| 6,082,891 | * 7/2000 | Schubert et al. | 366/340 |

FOREIGN PATENT DOCUMENTS

| | | | |
|---|---|---|---|
| 128156 | * 9/1976 | (DD) | 366/337 |
| 3926466 A1 | 2/1991 | (DE) . | |
| 4416343 C2 | 11/1995 | (DE) . | |
| 4433439 A1 | 3/1996 | (DE) . | |
| 19540292 C1 | 1/1997 | (DE) . | |
| 2073604 A | 10/1981 | (GB) . | |
| 57 087820 A | 6/1982 | (JP) . | |
| WO 88/06941 | 9/1988 | (WO) . | |
| WO 95/30476 | 11/1995 | (WO) . | |
| WO 96/30113 | 10/1996 | (WO) . | |

* cited by examiner

Primary Examiner—Charles E. Cooley
(74) Attorney, Agent, or Firm—Venable; Norman N. Kunitz

(57) ABSTRACT

A method and a device for producing a dispersed mixture from at least two phases. To do this, the first and the second phase are subdivided into split streams so that the split streams from the first phase are located on a first flat layer and the split streams from the second phase are located on a second flat layer, the split streams of the first phase inside the flat layer being fed onto the split streams of the second phase at an angle in order to bring about a dispersion and mixing process, wherein the flat layers are directly arranged on top of each other, and parallel to each other. The device consists of at least one base unit containing two foils into which a parallel assembly of grooves is inserted on one side of each foil. Both foils are configured in the base unit such that the sides of the foils fitted with grooves lie on top of each other and form an angle with each other.

16 Claims, 6 Drawing Sheets

METHOD AND DEVICE FOR PRODUCING A DISPERSED MIXTURE VIA CROSSING PARTIAL FLOWS

BACKGROUND OF THE INVENTION

The invention relates to a method and a device for producing a dispersed mixture; and Dispersing refers to the dispersal and smallest possible distribution of one material in another one. The finished mixture is then referred to as dispersion. A dispersion means that one or several dispersed phases, the inner phases, are present in a continuous phase, the outer phase. If the dispersed phase is completely soluble in the continuous phase, then the dispersion immediately changes to a homogeneous mixture. Typical examples of dispersions produced through dispersal in the field of chemical process engineering include:

Liquid—liquid systems:
   emulsions (dispersed phase: liquid, continuous phase: liquid); examples: oil-in-water emulsions, water-in-oil emulsions
Gas-liquid systems:
   aerated liquids or melts (dispersed phase: gas, continuous phase: liquid), e.g. foam products
   mist (dispersed phase: liquid; continuous phase: gas)
Liquid-solid material systems:
   suspensions (dispersed phase: solid material; continuous phase: liquid) for which the solid material phase is realized during the dispersion process, for example, through precipitating out of a supersaturated, dissolved material.

Dispersal refers to the purely physical action of dispersing, as is the case for producing emulsions. The dispersing action is used, for example, as introductory, primary dispersing step or as re-dispersing step that follows a primary dispersal when realizing chemical reactions in two-phase or multiphase reaction systems.

When realizing chemical reactions, the ratio of material transport speed to kinetics determines to what degree the reaction sequence can be accelerated through intensifying the dispersion operation, meaning by increasing the interfaces between the phases involved in the reaction. Thus, for very fast chemical reactions, the material transport between the phases involved in the reaction as a rule is critical for the chemical conversion speed and thus for the reactor output that can be achieved. Accordingly, an essential object during the dispersing operation is to generate the highest possible interface per reaction volume, meaning the smallest possible particles to be dispersed (e.g. liquid drops, gas bubbles) and to minimize the energy expenditure required for this.

It is the object of technical dispersion processes to disperse and finely divide one or several components equally and reproducibly in a continuous phase. The various goals to be achieved in this case are, among other things, the reproducible production of dispersions with defined particle sizes for the dispersed phase, the smallest possible particles with correspondingly large volume-specific interface between dispersed and continuous phase, as well as narrow particle size distributions. The dispersion device used for the dispersing must be configured and designed in such a way that it can handle the dispersing task with minimum energy expenditure, meaning with high efficiency.

Many different dispersion devices are presently used for the dispersion process. In principle, a distinction must be made between dynamic dispersion devices and static dispersion devices.

With dynamic dispersion devices, the dispersed phase and the continuous phase are generally put into motion, wherein energy is introduced by way of the turbulent flow energy of the phases in motion. For static dispersion devices, only the dispersed phase is generally put into motion.

Dynamic dispersion devices for liquid—liquid systems include, for example, nozzles, nozzles combined with subsequently installed stream-dispersing means, stirrers, as well as rotor-stator systems; for gas-liquid systems, for example, they include injectors or ejectors, Venturi nozzles and stirrers, and for liquid-solid material systems, for example, they include precipitating nozzles and stirrers.

Static dispersion devices for liquid—liquid, gas-liquid, as well as solid material-liquid systems include, e.g. push-in pipes, sieve plates, perforated plates that are made of metal, rubber or plastic, optionally also with pulsating plate, pipe distribution rings as well as sintered plates made of glass or metal. Sintered plates are preferably used for gas-liquid systems.

The disadvantage when using known dynamic dispersion devices is that the distribution of the dispersed phase occurs in a spatially expanded, turbulent shear field, wherein the unequal distribution of the local energy dissipation rates leads to broader particle size distributions for the dispersed phase. In order to produce dispersions with low average particle dimensions for the dispersed phase and correspondingly large, volume-specific interfaces, a comparably high energy expenditure is required.

In contrast to dynamically operated devices, the static dispersion devices available at present generally have a more favorable energy ratio, meaning the ratio of generated volume-specific interface to energy expenditure provided is higher. The absolutely achievable, volume-specific interface that can be achieved with static devices, however, is generally small.

The German Patent 44 16 343 A1 discloses a static micro-mixer, which consists of a stack of foils. Parallel systems of slanted grooves are worked respectively into one side of the foil. The foils are stacked in such a way that the slanted grooves of each second foil extend in a mirror-image arrangement to the grooves of the two neighboring foils. Together with the smooth side of a neighboring foil, the grooves then form closed channels. The micro-mixer can be used to mix fluids, in such a way that the slanted channels are alternately admitted with respectively one fluid. When the fluids exit from the micro-mixer, minute fluid streams are formed, which intermingle completely. With the micro-mixer, the mixing operation therefore occurs outside of the device.

The subject matter of the German Patent 44 33 439 A1 is a method for realizing a chemical reaction by means of the device, described in the above-mentioned German Patent 44 16343 A1.

A micro-reactor is described in the German Patent 39 26 466 A1 for which the mixing of fluids is to take place inside the micro-reactor. Two reaction partners A and B are separated into partial flows by a laterally extending groove that is provided in an intermediate foil and forms a mixing space. Two fluid flows are conducted in parallel micro-channels, extending immediately below or immediately above the intermediate foil. These fluid flows must be mixed in the laterally extending groove of the intermediate foil. The channels below the intermediate foil are arranged perpendicular to the channels above the intermediate foil. With respect to design, this results in a foil triplet, comprising a foil for A, an intermediate foil with the laterally extending groove, and a foil for B. A plurality of such triplets can be stacked one above the other.

With the known micro reactor, the still unmixed liquids flow through channels of different lengths until they reach the laterally extending grooves. This results in at least one incomplete mixing within the micro reactor. In addition, a share of the two material flows should respectively pass by the laterally extending groove and be conducted further in the channels for the respectively other material flow. This would lead to a high pressure loss in the respective shares. For that reason, the known micro reactor cannot be used without modifying the design as shown.

The WO-A-9630113 discloses a device for mixing small amounts of liquid, wherein a liquid to be mixed thoroughly enters an inlet channel, is divided there into at least two branching-off micro channels that are positioned in one plane and is subsequently combined again with the aid of a confluence element that is rotated by 90° relative to the plane. From this confluence element, the liquid is then conducted into an additional micro channel in the plane. The additional micro channel can form the inlet channel for another such device. The device does not comprise separate inlet channels for the liquid components to be mixed.

It is the object of the invention to provide a method and a device for producing a dispersed mixture from at least two phases, wherein the mixture is produced inside of the device. A less severe pressure drop must occur during the dispersion of the phases.

SUMMARY OF THE INVENTION

The above object is solved by the method and the device according to the invention. A number of preferred embodiments of the device likewise are disclosed.

With the method according to the invention, the first as well as the second phase preferably should be divided into parallel partial flows. The partial flows of the first phase are located in a first planar layer and the partial flows of the second phase in a second planar layer. Within the respective planar layers, the partial flows of the first phase are conducted at an angle to the partial flows of the second phase, in such a way that the dispersion and mixing operation is triggered. The first and the second planar layer are arranged such that they are parallel to each other and adjoin directly.

The thickness of the planar layers can be less than 1000 $\mu$m, preferably less than 300 $\mu$m.

The device according to the invention is configured such that it has at least one base unit. The base unit consists of two foils, into which a system of parallel grooves has respectively been cut on one side, for example by cutting them with a shaped diamond as described in the German Patent 37 09 278 A1. In principle, an unlimited number of grooves can be cut into each foil. However, this number preferably ranges between 2 and 300, wherein the number of grooves in the two foils of the base units does not have to be the same.

The length of the grooves in the foil for the device according to the invention can be selected according to the respective area of use for the device. In general, the groove length is between 2 mm and 50 mm.

In principle, the grooves can have nearly optional cross sections, e.g. semi-circular, triangular or trapezoid. The grooves for one preferred embodiment, however, have nearly rectangular cross sections. The width and height of the grooves for both phases preferably is between 10 $\mu$m and 1000 $\mu$m. Especially preferred are grooves with a width and height between 10 $\mu$m and 300 $\mu$m. It is advantageous for the grooves of the dispersed phase to be kept as short as possible and, within the specified bandwidth for groove dimensions, for the grooves to be designed larger than the grooves for the continuous phase. The web width between grooves preferably amounts to between 10 $\mu$m and 2000 $\mu$m, in particular between 10 $\mu$m and 500 $\mu$m.

The two foils are stacked one above the other, such that the sides provided with grooves are respectively placed on top of each other and the grooves of the upper and the lower foil jointly enclose an angle, preferably a right angle.

The grooves preferably extend over the complete side of the foils. Thus, if two foils are fitted one above the other in the manner as indicated, two groups of openings appear on the sides of the base unit, which correspond to the start and the end of each of the two bundles of grooves. If the foils are square, for example, and if the grooves extend parallel to two edges, a group of openings becomes visible in each side surface of the base unit when the foils are fitted one above the other, such that the grooves jointly enclose a right angle. The openings in the side surfaces of the base unit serve as intake openings and outlet openings for the phases or for the dispersed mixture. Since only one outlet opening is provided as a rule, the remaining three inlet openings can be connected in accordance with the specified dispersing operation.

A larger number of base units, for example 50, are stacked one above the other for commercial dispersion processes. In that case, the openings in the sides of the device, which correspond to each other, are interconnected as inlet openings and outlet openings.

With the device according to the invention, each phase is divided into a plurality of partial flows. The partial flows of various phases are conducted at an angle to each other, e.g. a 90° angle, so that the partial flows make contact in the joint edge region of the flows. Micro-shearing surfaces form in that region, which serve to deflect the dispersed phase and distribute it over the continuous phase.

As a result of the shearing forces, which are locally effective on the smallest volume, high volume-specific energy dissipation rates occur in the region of the micro shearing surfaces between the two phases. In the process, micro-volumes are sheared from one flow and are pulled along by the other flow. The shear gradient between continuous phase and dispersed phase that triggers the dispersing action is extremely high for the preferred groove dimensions of 10 $\mu$m to 1000 $\mu$m and the resulting high gradient for the speed.

The dimensions for the micro shearing surfaces follow from the widths a and b of the grooves in the two foils for the base unit. It is preferable if the micro shearing surface dimensions are smaller than 500 $\mu$m, so as to make effective use of the advantage that is offered by the microstructure technology as a result of the dimensions in the micrometer range for the dispersion and mixing operations. The specific energy dissipation rate that is limited to the smallest microshearing volumes in this case is higher than for the known devices.

In the event that the two phases do not react chemically and are also not soluble into each other, a fine distribution of the dispersed phase in the continuous phase is generated on the basis of the distribution of the phases over a large number of partial flows. In the event that the two phases also react chemically, optimum starting conditions for the chemical reaction sequence have thus been created through the fine distribution of the dispersed phase in the continuous phase.

The device according to the invention can be used for the smallest amounts as well as for commercial flow rates. A few to several tens of thousands of micro-shearing surfaces can be accommodated in a cm$^3$ of the micro-dispersion device by varying the number of micro channels.

Further advantages are the improvement in the yield, the selectivity and the product quality for the chemical reactions realized in the device according to the invention. Owing to the fact that the particle size distribution can be adjusted, the device makes it possible to obtain products with new characteristic profiles. Another advantage must be seen in the very small inside dimensions of the device, which make it possible to significantly lower the expenditure for safety and operating content of the device. Heat can be dissipated efficiently if micro heat exchangers are installed downstream.

In addition to the efficient heat dissipation, the advantage of feeding a two-phase or multiphase mixture into the micro channels of a connected micro heat exchanger is that high speed gradients and thus also high shearing forces occur as a result of the small channel dimensions, which can lead to a suppression of the coalescence, as well as an evening out of the particle size spectrum.

The preferred areas of application for the device are the production of emulsions in fluid—fluid systems, as well as the production of dispersions such as aerated liquids, foam products, mist and suspensions (resulting from precipitation processes). A chemical reaction in this case can follow the actual dispersion process. Further areas of application are the homogenization of dispersions with the goal of adjusting narrower particle size distributions, the re-dispersing of dispersions to counteract a phase separation, e.g. through coalescence, as well as the homogeneous mixing of liquids and gases.

The invention is explained in further detail in the following with the aid of Figures,

DETAILED DESCRIPTION OF THE PREFERRED EMBODIMENTS

Figure 1A:
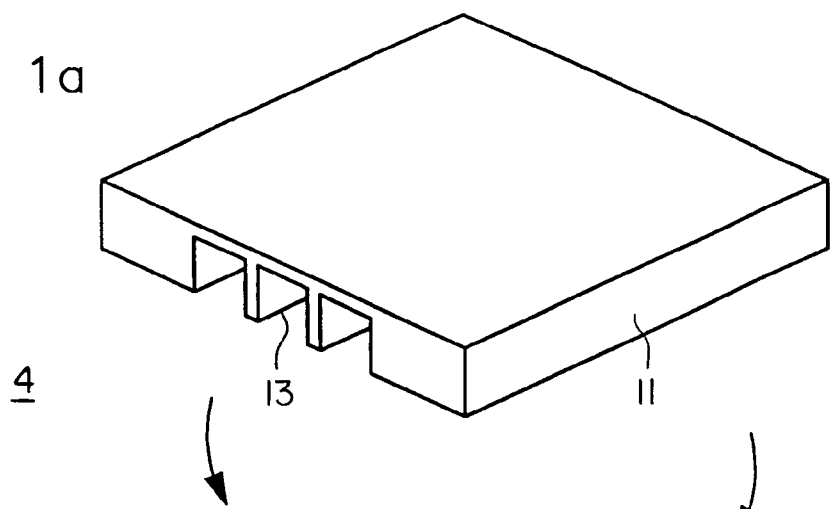
FIGS. 1a–1c show the configuration of an embodiment of the device according to the invention.
Figure 1B:
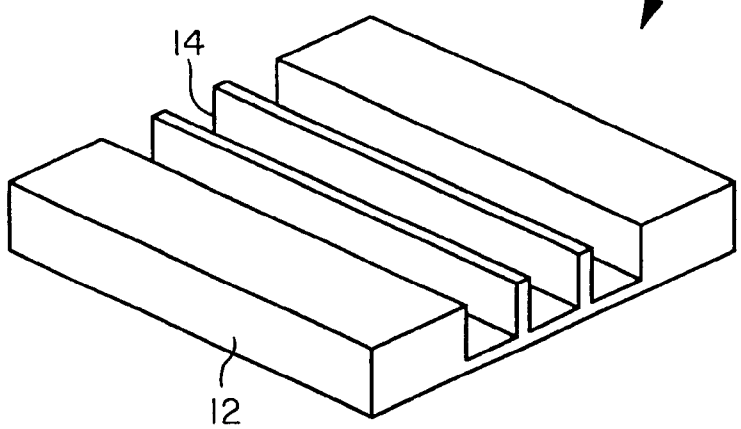
Figure 1C:
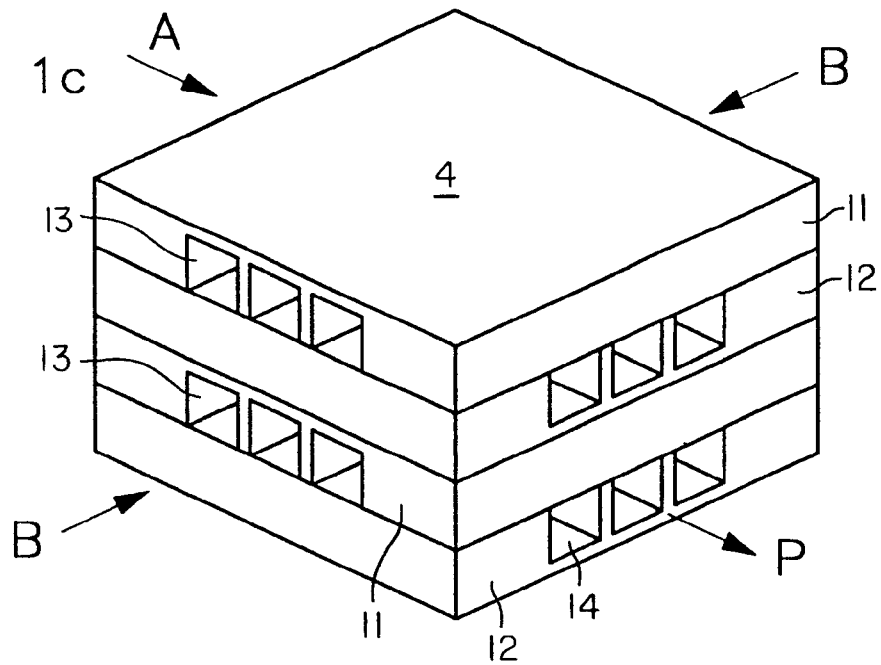

FIGS. 1a–1c shows the schematic configuration of an embodiment of the device according to the invention. The FIGS. 1a and 1b respectively show square foils 11,12 with grooves 13, 14 that have a rectangular cross section and extend parallel to two sides of the square. The two foils 11,12 are placed one on top of the other, as indicated by the arrows. In FIG. 1c, a stack composed of two base units is shown. In each side surface of the stack, the grooves 13 or 14 form openings that are used as inlet opening and outlet openings. In the embodiment shown, the continuous phase A flows from the rear into the device. The dispersed phase B is fed in at the two side surfaces, which are perpendicular thereto. The product P leaves the device through the right front.

Figure 2:
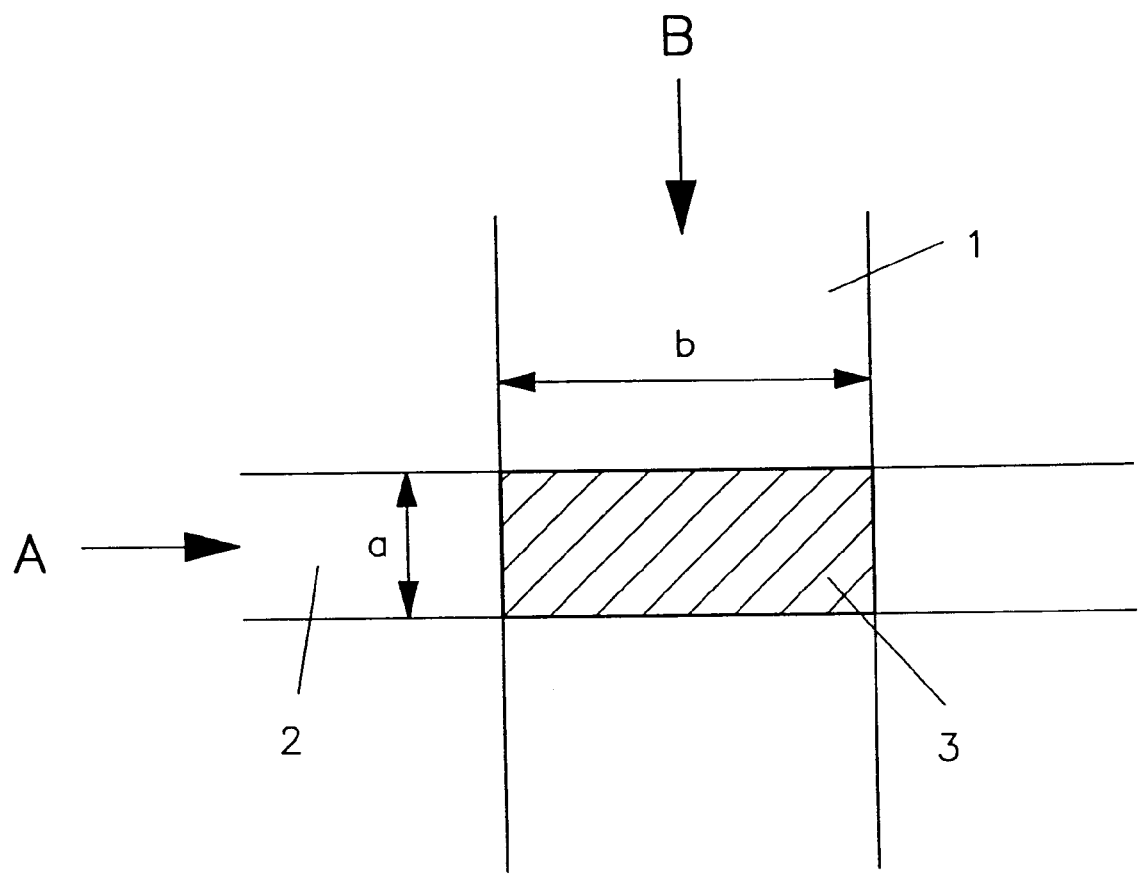
FIG. 2 shows a micro-shearing surface.

FIG. 2 schematically shows a micro shearing surface. The grooves 1 for the dispersed phase B intersect with the grooves 2 for the continuous phase A, thereby forming the micro shearing surface 3, the dimensions of which are provided by the widths a and b of the two grooves.

Figure 3A:
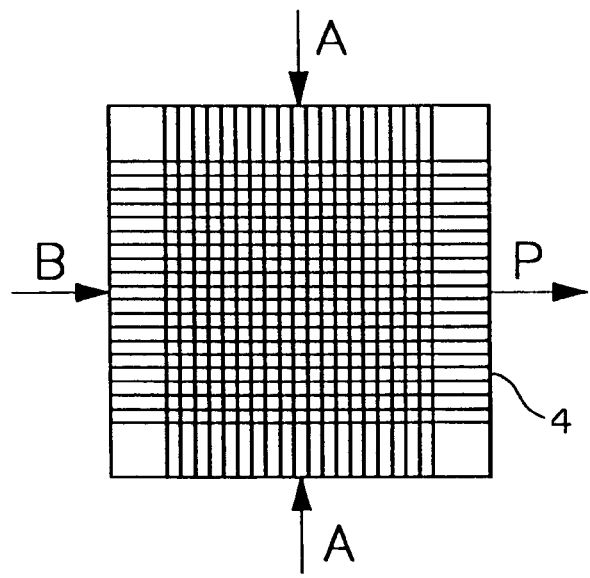
FIGS. 3a–3c show various options for interconnecting.
Figure 3B:
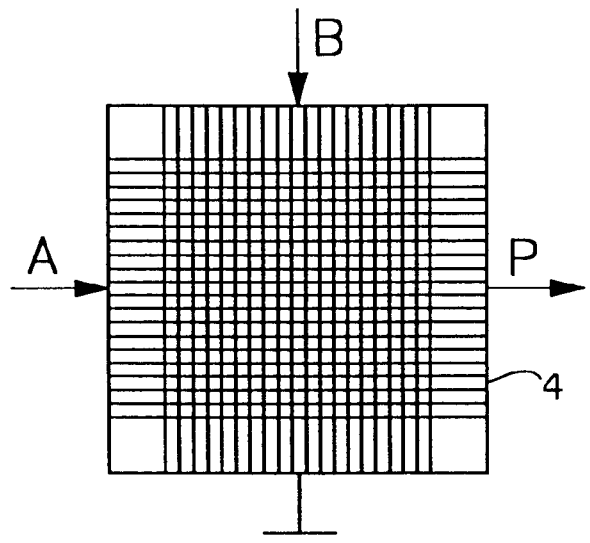
Figure 3C:
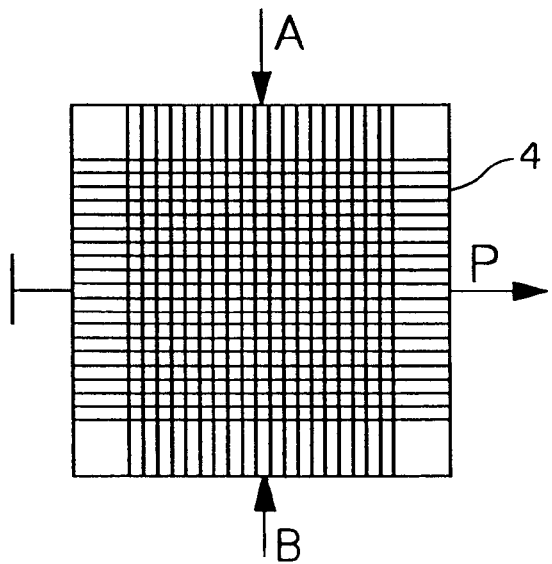

FIGS. 3a–3c shows the various phase-connection options. The guidance of phase A (continuous phase) and B (dispersed phase) can be designed differently within the device. Thus, the feeding of A and B can be reversed, as compared to the FIGS. 1a–1c (FIG. 3a). The feeding of B does not have to be on both sides, but can also occur on one side only (FIG. 3b). Another interconnecting option consists of A and B flowing in from the respectively opposite sides (FIG. 3c). The interconnections shown in FIGS. 3a to 3c can be arranged serially one after another, in an optional manner, e.g., if a multiple dispersion of more than 2 phases is required. A serial interconnection of several devices is advantageous, even if a large interface must be maintained for the duration of a parallel-occurring chemical reaction, that is to say a re-dispersion must be used to counteract an irreversible phase separation through coalescence.

Figure 4:
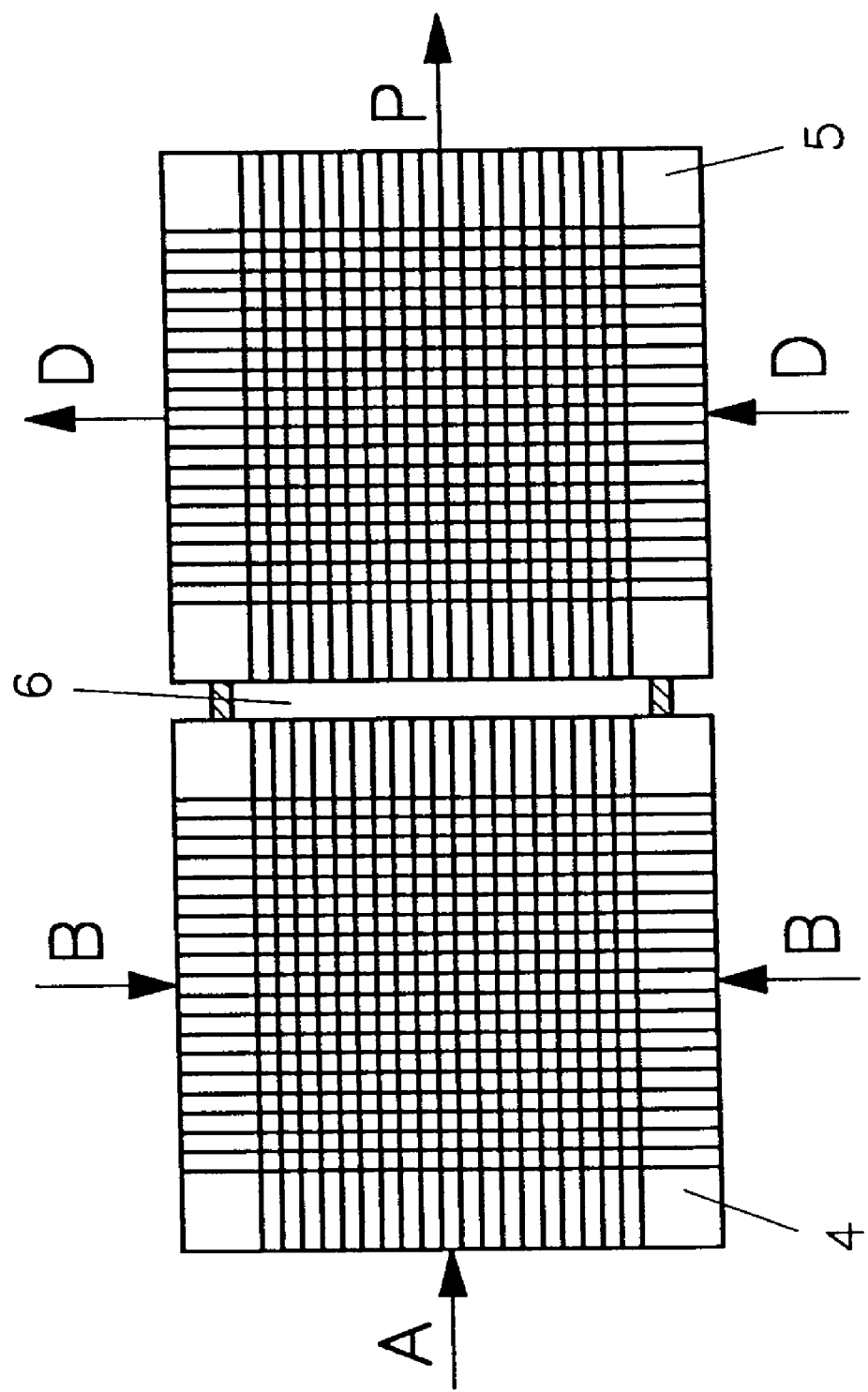
FIG. 4 shows the combination of the device according to the invention with a micro heat exchanger.

With strongly exothermal or endothermal reaction sequences, it is recommended to install one or several serially arranged, downstream installed micro heat exchangers in accordance with FIG. 4. Micro heat exchangers that are suitable for this purpose are described in the German Patent 37 09 278 A1. With several serially connected micro heat exchangers, the volume-specific heat-exchange output of the individual heat exchangers can be adapted to the respective local heat production of the chemical reaction. As a rule, the heat production decreases along the reaction path, so that the volume-specific heat exchange output of the micro heat exchangers can be reduced correspondingly, e.g., by increasing the micro channel dimensions. This results in noticeably lower pressure losses for the flow through the grooves. In FIG. 4, the continuous phase is again given the reference A, the dispersed phase the reference B and the cooling and heating medium is given the reference D. The device 4 according to the invention is shown as a diagram on the left side. A micro heat exchanger 5 is positioned on the right side and is separated from the device 4 by a distribution zone 6.

The invention is explained further in the following with the aid of an example.

EXAMPLE

Figure 5A:
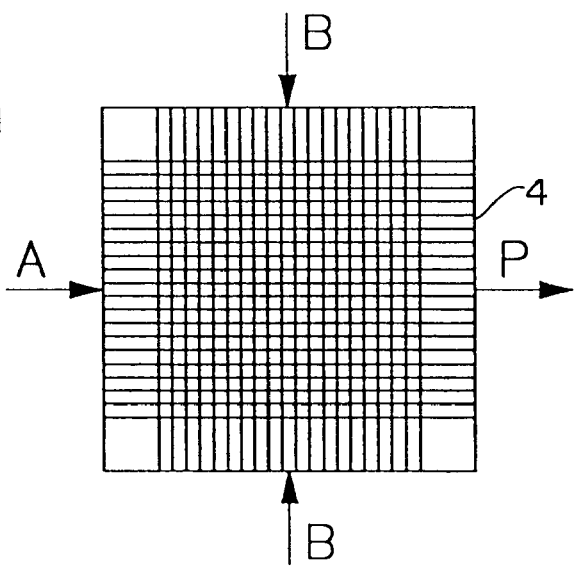
FIGS. 5a–5c shows comparative representation with the device according to the invention, a conventional two-stage nozzle and a one-stage, subsequently connected stream dispersion device.

In order to evaluate the dispersion behavior of the micro dispersion device for liquid—liquid systems, paraffin oil W15 (dynamic viscosity 15 mPas) is emulsified at 20° C. with distilled water. In order to stabilize the emulsion, an emulsifier is added during to the oil phase (HBL 11.5, 10 mass % referred to the oil phase). The emulsion is produced continuously in that water and paraffin oil are supplied separately to the dispersion device. The volume flow ratio of paraffin oil to water is 30:70. The emulsifying process leads to an oil-in-water emulsion. The experiments were primarily intended to minimize the energy output necessary for producing the emulsion. Used was a micro-dispersion device according to FIG. 5a.

The following specifications apply to the micro-dispersion device used

Passage A:
    33 metal foils with respectively 77 micro channels, that is a total of 2541 micro channels; channel width is 100 $\mu$m, channel height 70 $\mu$m, channel length is 14 mm, web width between two parallel micro channels is 30 $\mu$m;

Passage B:
    33 metal foils with respectively 39 parallel micro channels, that is a total of 1287 micro channels; channel width 200 $\mu$m, channel height 140 $\mu$m, channel length 14 mm, web width between two parallel micro channels is 60 $\mu$m;

number of micro shearing surfaces: 99099 active component volume: 1 $cm^3$ material: stainless steel 1.4301.

Figure 5B:
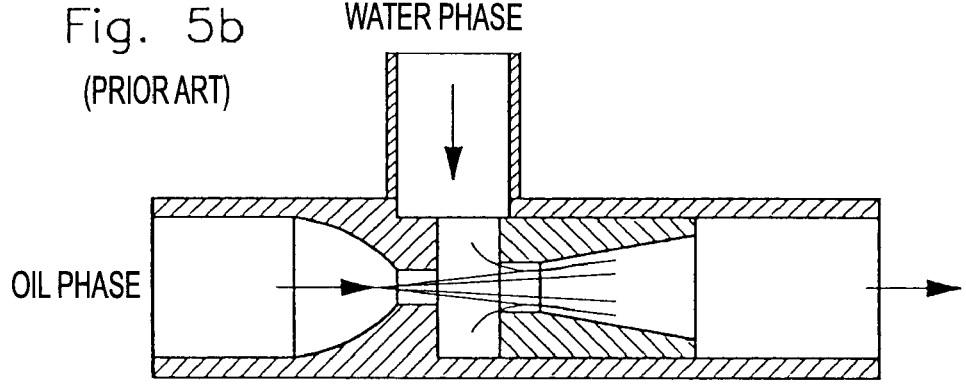
Figure 5C:
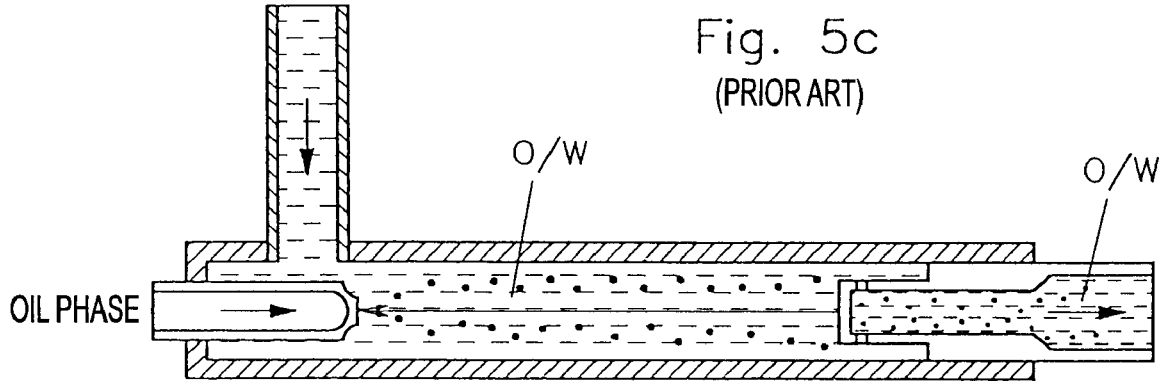

In order to be able to evaluate the output of the micro dispersion device, emulsions were produced under the same experimental conditions by means of a two-stage nozzle (FIG. 5b) and a one-stage nozzle with subsequently connected stream-dispersing means (FIG. 5c).

In the experiments 1 to 4, various flow control variations were tested using the micro dispersion device (FIG. 6):

Experiment V1: oil flowing in from both sides via the passage B, water flowing in from one side via the passage A;

Experiment V2: water flowing in from both sides via B, oil flowing in from one side via A;

Experiment V3: oil flowing in from both sides via A, water flowing in from one side via B;

Experiment V4: water flowing in from both sides via A, oil flowing in from one side via B.

Different types of conventional nozzles were tested in the experiments 5 to 7:

Experiment V5: two-stage nozzle, diameter for the $1^{st}$ nozzle: 0.3 mm; diameter for the $2^{nd}$ nozzle: 0.4 mm;

Experiment V6: two-stage nozzle, diameter for the $1^{st}$ nozzle: 0.6 mm; diameter for the $2^{nd}$ nozzle: 1.1 mm;

Experiment V7: one-stage nozzle with subsequently connected stream dispersion means, nozzle diameter 0.6 mm, stream dispersion means with two 0.8-mm bores along the circumference.

Figure 6:
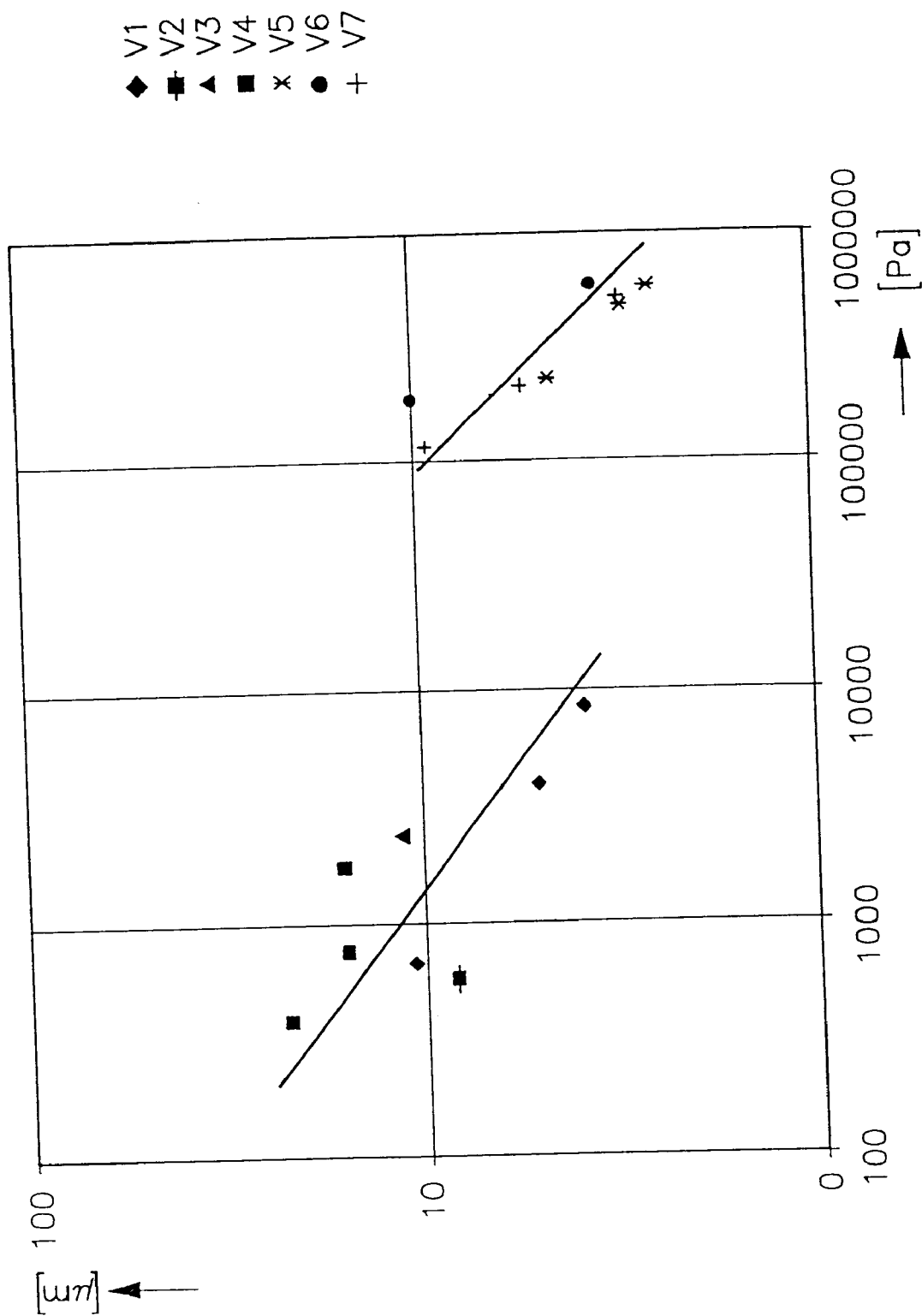
FIG. 6 shows the average drop size in dependence on the average dynamic pressure loss.

The median value for the drop size (dimension μm), determined with the aid of light diffraction, is plotted in FIG. 6 above the average dynamic pressure loss $P_m$ (dimension Pa), which is significant for the emulsifying process. In this case, the wall friction occurring in the micro channels of the micro dispersion device is not taken into account. The average dynamic pressure loss is obtained by taking the mean via the volume flows for fluids A and B.

$P_m = (r/2\ u^2)_A * V_A/V_{ges} + (r/2\ u^2)_B * V_B/V_{ges}$
$P_m$ = average dynamic pressure loss
r = fluid density
u = fluid speed in the micro channels
$V_A$ = volume flow of fluid A
$V_B$ = volume flow of fluid B
$V_{ges} = V_A + V_B$ This plotting shows that in order to produce a specific average drop size when using a micro dispersion device, considerably lower dynamic pressure losses (approximately a factor 100) are required than for conventional devices.

What is claimed is:

1. A method for producing a dispersed mixture with at least a first and a second phase,
   a) wherein the first as well as the second phase are separated into partial flows, so that
   b) the partial flows of the first phase are located in a first planar layer and the partial flows of a second phase in a second planar layer,
   c) the partial flows of the first phase within the first planar layer are supplied at an angle to the partial flows of the second phase in order to trigger a dispersion and mixing process, wherein
   d) at points of intersection, the partial flows of the first phase are combined with the partial flows of the second phase and are mixed, and
   e) the planar layers are arranged parallel and one above and in contact with the other.

2. A device for producing a dispersed mixture from at least a first phase and a second phase, consisting of at least one base unit, which
   comprises two foils,
   into which a parallel bundle of grooves is inserted respectively on one side of the foils,
      wherein the two foils are combined in the base unit such that
   the sides of the two foils that are provided with the grooves are positioned one above and in contact with the other and
   the grooves together form an angle.

3. A device according to claim 2, having an angle of 90°.

4. A device according to claim 3, comprising rectangular foils where the grooves extend parallel to two edges of the foils.

5. A device according to claim 4, having grooves with a width and depth of between 10 and 1000 μm.

6. A device according to claim 3, having grooves with a width and depth of between 10 and 1000 μm.

7. A device according to claim 3, having a micro heat exchanger that is installed downstream of a product outlet for the device.

8. A device according to claim 7, having grooves with a width and depth of between 10 and 1000 μm.

9. A device according to claim 2, having grooves with a width and depths of between 10 and 1000 μm.

10. A device according to claim 2, having a micro heat exchanger that is installed downstream of a product outlet for the device.

11. A device according to claim 9, having grooves with a width and depth of between 10 and 1000 μm.

12. A device for producing a dispersed mixture from at least a first phase and a second phase, comprising:
    at least one base unit including two foils, each having a parallel bundle of grooves formed in one flat surface thereof, with the two foils being arranged such that the respective surfaces of the two foils provided with the grooves are in contact with one another, with the respective grooves crossing one another and enclosing an angle.

13. A device according to claim 12 wherein the angle is a right angle.

14. A device according to claim 12, wherein the foils are rectangular and the grooves extend parallel to two edges of the respective foil and intersect the other two edges of the respective foil.

15. A device according to claim 12 wherein the grooves have a width and depth of between 10 and 1000 μm.

16. A method for producing a dispersed mixture of at least a first and a second phase, comprising:
    separating the first as well as the second phase into respective partial flows, with the partial flows of the first phase being located in a first planar layer and the partial flows of the second phase being located in a second planar layer that is parallel to the first planar layer;
    supplying the partial flows of the first phase within the first planar layer at an angle to the partial flows of the second planar layer so that the respective partial flows touch and cross one another to cause a combination and mixing of the partial flows of the first phase with the partial flows of the second phase at points of intersection of the respective partial flows, in order to trigger a dispersion and mixing operation.

* * * * *